US012654558B2

(12) United States Patent
Hickey et al.

(10) Patent No.: US 12,654,558 B2
(45) Date of Patent: *Jun. 16, 2026

(54) VEHICLE SYSTEM

(71) Applicant: GM Global Technology Operations LLC, Detroit, MI (US)

(72) Inventors: Ryan Patrick Hickey, Austin, TX (US); Russell A. Patenaude, Macomb Township, MI (US); Matthew Edward Gilbert-Eyres, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 122 days.

This patent is subject to a terminal disclaimer.

(21) Appl. No.: 18/516,227

(22) Filed: Nov. 21, 2023

(65) Prior Publication Data

US 2025/0162424 A1     May 22, 2025

(51) Int. Cl.
| | |
|---|---|
| *G07C 5/00* | (2006.01) |
| *B60L 3/00* | (2019.01) |
| *B60L 3/12* | (2006.01) |
| *B60L 58/15* | (2019.01) |
| *G07C 5/02* | (2006.01) |
| *G07C 5/04* | (2006.01) |
| *G07C 5/08* | (2006.01) |

(52) U.S. Cl.
CPC .............. *B60L 3/12* (2013.01); *B60L 3/0046* (2013.01); *B60L 58/15* (2019.02); *B60L 2240/547* (2013.01)

(58) Field of Classification Search
CPC .......... B60L 3/12; B60L 3/0046; B60L 58/15; B60L 2240/547
See application file for complete search history.

(56) References Cited

U.S. PATENT DOCUMENTS

| | | | | |
|---|---|---|---|---|
| 10,467,827 B2 * | 11/2019 | Taylor | ................... | B60L 3/0046 |
| 10,493,991 B2 * | 12/2019 | Kurauchi | ............... | G06Q 50/40 |
| 10,546,438 B2 * | 1/2020 | Chen | ....................... | B60L 1/003 |
| 2012/0143411 A1 * | 6/2012 | Koprubasi | ...... | B60W 30/18054 |
| | | | | 180/65.265 |
| 2016/0116544 A1 * | 4/2016 | Li | ........................ | G01R 31/374 |
| | | | | 324/427 |
| 2019/0176825 A1 * | 6/2019 | Kurauchi | ............ | B60W 30/182 |
| 2019/0232792 A1 * | 8/2019 | Ahmed | ................... | B60L 53/66 |
| 2021/0094438 A1 * | 4/2021 | Ciccone | ................. | B60L 58/24 |
| 2022/0074995 A1 * | 3/2022 | Bharathraj | ............. | B60L 58/12 |

(Continued)

*Primary Examiner* — Kito R Robinson
*Assistant Examiner* — Anthony Gabriel Mora
(74) *Attorney, Agent, or Firm* — Honigman LLP; Matthew H. Szalach; Jonathan P. O'Brien

(57) ABSTRACT

A vehicle system for a vehicle includes a vehicle processor for storing vehicle data including vehicle location, vehicle event data, and vehicle mode. The vehicle system also includes a server communicatively coupled to the vehicle processor. The server is configured to determine if a transport mode has been selected based on one or more of the vehicle mode or the vehicle location. The server is also configured to determine if a current battery change is above a state-of-charge limitation based on the vehicle event data. Additionally, the server is configured to activate the transport mode if the current battery charge is below the state-of-charge limitation.

14 Claims, 2 Drawing Sheets

(56) References Cited

U.S. PATENT DOCUMENTS

| | | | | |
|---|---|---|---|---|
| 2023/0100393 A1* | 3/2023 | Shi | ....................... | H02J 7/00034 |
| | | | | 307/104 |
| 2024/0149863 A1* | 5/2024 | Shin | .......................... | B60L 7/18 |
| 2024/0175695 A1* | 5/2024 | Kagara | ................ | G01C 21/343 |
| 2024/0286519 A1* | 8/2024 | Lee | .......................... | B60L 53/51 |
| 2025/0065894 A1* | 2/2025 | Luo | ................... | B60W 50/0205 |
| 2025/0164337 A1* | 5/2025 | Park | ........................ | B60R 16/03 |

\* cited by examiner

VEHICLE SYSTEM

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a vehicle system for complying with state-of-charge limitations.

Many vehicles are now electric vehicles powered using batteries. Batteries, particularly fully charged batteries, may pose a fire risk under certain conditions. Accordingly, electric vehicles being transported or stored are often maintained at a charge below a maximum charge and, ideally, within a safety charging capacity window to mitigate any fire risks. The safety charging capacity window is often below the maximum charge but above zero charge, as additional risks to the vehicle can occur if vehicle battery life is at or near zero.

Some transport vehicles now require state-of-charge limitations to help mitigate the risks associated with transporting electric vehicles. While some vehicles include a transport mode that limits charging to a certain percentage after leaving the manufacturing plant, once the vehicle arrives at its destination such as a dealership, the charging limitation is removed. Once the charging limitation is removed, the vehicle may be fully charged for normal use.

While fully charging a vehicle for normal use will allow the vehicle to function properly, returning the vehicle to the transport mode with a fully charged battery may result in damage to the battery and/or the vehicle. Accordingly, a need remains to safely and easily put the vehicle in transport mode at any time while complying with state-of-charge limitations.

SUMMARY

In some examples, a vehicle system for a vehicle includes a vehicle processor for storing vehicle data including vehicle location, vehicle event data, and vehicle mode. The vehicle system also includes a server communicatively coupled to the vehicle processor and configured to determine if a transport mode has been selected based on one or more of vehicle location and vehicle mode. The server is also configured to determine if a current battery charge is above a state-of-charge limitation based on the vehicle event data. Additionally, the server is configured to determine if long-range connectivity is active based on the vehicle event data. The server is configured to issue a notification that the transport mode cannot be activated if the current battery charge is above the state-of-charge limitation or if long-range connectivity is inactive.

In some examples, the server is configured to issue a notification if long-range connectivity becomes active. Additionally, if the server determines that long-range connectivity is active, the server may discharge the battery upon user activation. In some examples, discharging the battery includes one or more of discharging energy from the battery back to an energy grid through a vehicle charger or activating battery depleting operations. The battery depleting operations may include one or more of enabling max accessory loads including one or more of a chiller operation increase, an increase in coolant flow rate, additional vehicle imaging, activating vehicle sensors to a high-load mode, activating discharge of cell groups by activating cell balancing resistors, and activating inefficient operation of vehicle components including one or more of a vehicle motor or vehicle inverter. Additionally, the server may be configured to activate the transport mode once the current battery charge is below the state-of-charge limitation and the long-range connectivity is active. A vehicle may incorporate the vehicle system.

In another configuration, a vehicle system for a vehicle includes a vehicle processor for storing vehicle data including vehicle location, vehicle event data, and vehicle mode. The vehicle system also includes a server communicatively coupled to the vehicle processor and configured to determine if a transport mode has been selected based on one or more of vehicle location, vehicle mode, or vehicle event data. The server is also configured to determine if a current battery charge is below a state-of-charge limitation based on the vehicle event data. The server determines the time it would take for the current battery charge to be less than the state-of-charge limitation, issues a notification of the time it would take for a battery charge to be less than the state-of-charge limitation, discharges the battery upon user activation, and activates the transport mode once the current battery charge is below the state-of-charge limitation.

In one configuration, discharging the battery may be accomplished by returning energy from the battery to a power grid. Additionally or alternatively, discharging the battery may be accomplished through battery depletion operations of the vehicle. In one configuration, the server may determine if the vehicle is coupled to a charger. The server may prompt the user to choose the mode of discharge of the battery. In some examples, the vehicle event data includes data related to the current battery charge. A vehicle may incorporate the vehicle system.

In yet another configuration, a vehicle system for a vehicle includes a vehicle processor for storing vehicle data including vehicle location, vehicle event data, and vehicle mode. The vehicle system also includes a server communicatively coupled to the vehicle processor and configured to determine if a transport mode has been selected based on one or more of the vehicle mode or the vehicle location. The server is also configured to determine if a current battery change is above a state-of-charge limitation based on the vehicle event data and to activate the transport mode if the current battery charge is below the state-of-charge limitation.

The server may discharge the battery upon user activation. Discharging the battery may include one or more of returning energy from the battery back to the grid and activating battery depleting operations. The battery depleting operations may include one or more of enabling max accessory loads including one or more of a chiller operation increase, an increase in coolant flow rate, additional vehicle imaging, activating vehicle sensors to a high-load mode, activating discharge of cell groups by activating cell balancing resistors, and activating inefficient operation of vehicle components including one or more of a vehicle motor or vehicle inverter. Additionally, the server may activate the transport mode once the current battery charge is below the state-of-charge limitation. A vehicle may incorporate the vehicle system.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
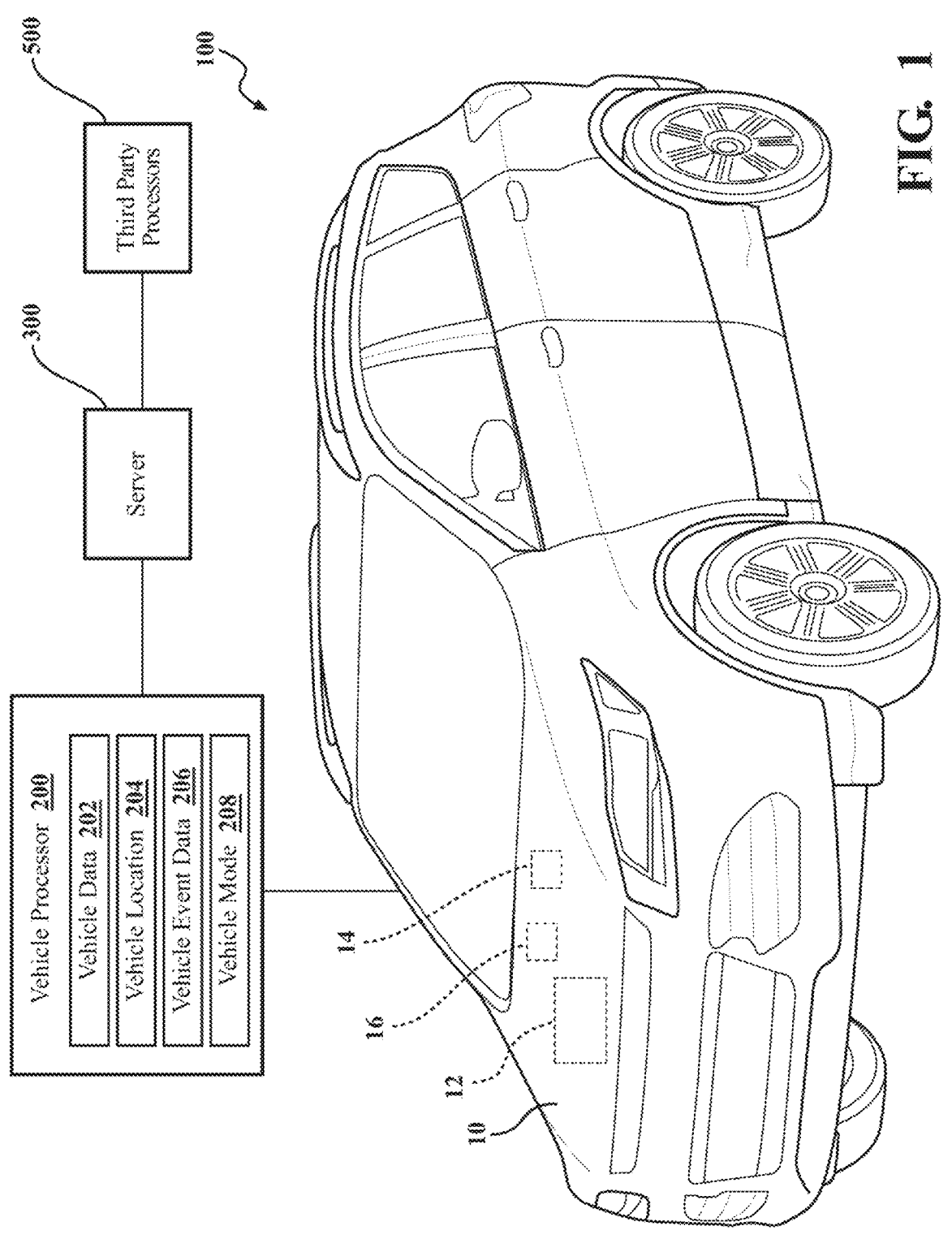
FIG. 1 is a perspective view of a vehicle incorporating a vehicle system according to one aspect of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 2:
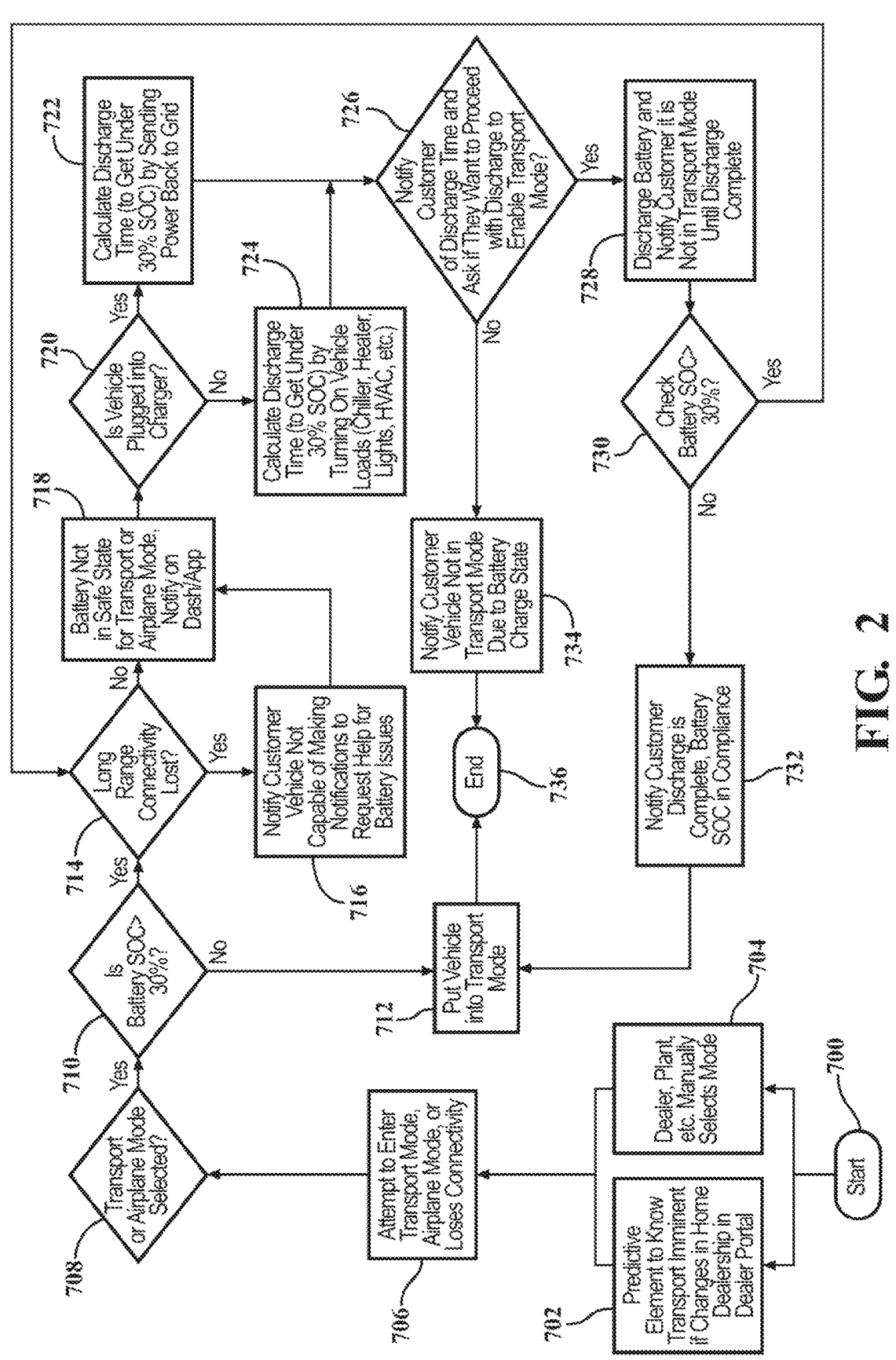
FIG. 2 is an exemplary operational flow chart according to one aspect of the present disclosure.

Referring to FIGS. 1 and 2, a vehicle system 100 for a vehicle 10 is illustrated in FIG. 1. The vehicle system 100 includes a vehicle processor 200 and a server 300 communicatively coupled with the vehicle processor 200. The vehicle 10 is contemplated to be an electric vehicle (EV) and may include autonomous or semi-autonomous capabilities. Additionally or alternatively, the vehicle 10 may be a hybrid electric vehicle (HEV) incorporating both EV and internal combustion engine (ICE) components and capabilities. While the vehicle 10 could be an EV or an HEV, the vehicle 10 will be described as incorporating only EV components and capabilities. The vehicle 10 also includes a vehicle battery 12 configured to provide power to the vehicle 10. The vehicle battery 12 is re-chargeable and includes a vehicle battery life between 0% and 100% with 0% representing no charge to the vehicle battery 12 and 100% representing a full charge of the vehicle battery 12. Additionally, the vehicle 10 may include a plurality of vehicle sensors 14 and/or vehicle cameras 16 configured to provide data to the vehicle processor 200.

The vehicle processor 200 stores vehicle data 202 of the vehicle 10. The vehicle data 202 includes vehicle location 204, vehicle event data 206, and vehicle mode 208. The vehicle location 204 generally pertains to a location of the vehicle 10. The vehicle location 204 may include one or more of current vehicle location and route information. The current vehicle location generally pertains to the current location of the vehicle 10. The current vehicle location may be obtained from a Global Positioning System (GPS) or other navigation system and may be communicated to the vehicle processor 200. Additionally or alternatively, the current vehicle location may be obtained using vehicle cameras 14 and/or sensors 16. For example, the vehicle processor 200 may gather video data related to the current environment of the vehicle 10 to assist the vehicle processor 200 and/or the server 300 in determining the current vehicle location.

Route information generally pertains to the route the vehicle 10 is traveling, including origin and destination information. The route information may be obtained from user input, a vehicle navigation system, or past driver activity and may be communicated to the vehicle processor 200. Additionally, route information may include the route which a transport vehicle is taking. Transport vehicles may include, but are not limited to, a car carrying truck or trailer, a train, or a cargo ship. The route information also may include information related to the transport vehicle including the transport vehicle schedule and/or weather conditions that may affect travel of the transport vehicle. Further, the route information may include data related to traffic information or road closures.

The vehicle event data 206 generally pertains to actions the vehicle 10 takes. Vehicle event data 206 may be gathered by any vehicle sensors 16 and/or vehicle cameras 14 and may be communicated to the vehicle processor 200 for further processing. For example, vehicle event data 206 may include vehicle ignition status, Wi-Fi connections, long-range connectivity status, vehicle speed, or other vehicle operations. More specifically, the vehicle ignition status may pertain to the current ignition status (i.e., whether the vehicle 10 is turned on or off), or may pertain to the amount of time elapsed since the last change of ignition status. Additionally, the Wi-Fi connections may relate to which Wi-Fi connections are coupled to the vehicle 10 and for how long. Moreover, the long-range connectivity status may pertain to whether the server 300 is connected to the vehicle 10 such that the vehicle 10 may receive updates and/or notifications from the server 300. The vehicle speed may pertain to the current speed of the vehicle 10, whether the vehicle 10 has stopped, whether the vehicle 10 has changed speed, accelerated, or decelerated, and other vehicle speed-related events. Moreover, the vehicle event data 206 may be constantly changing such that the vehicle event data 206 may be continually sensed and/or obtained during vehicle operation.

The vehicle mode 208 generally pertains to which mode or modes of the vehicle 10 are currently operating. For example, the vehicle mode 208 may relate to any vehicle mode or operation that may affect the battery life of the vehicle 10. The vehicle mode 208 may include, but is not limited to, operational modes including accessory modes, operation of individual vehicle components including vehicle engine or vehicle inverter, resistor mode, vehicle sensor modes, or other vehicle modes that require use of the vehicle battery 12. Additionally, the vehicle mode 208 may relate to a transport mode or an airplane mode. The transport mode or the airplane mode may be activated by a user through the vehicle dashboard or other vehicle component, through a third-party application, or through a user device such as a cellular phone or tablet. Additionally, it is contemplated that the airplane mode or transport mode may be activated by the server 300, as disclosed in more detail below. Moreover, the vehicle mode 208 may be constantly changing such that the vehicle mode 208 may be continually sensed and/or obtained during vehicle operation.

Transport companies often impose state-of-charge limitations on electric vehicles—such as the vehicle 10—prior to the vehicle 10 being allowed to be loaded onto a transport vehicle. In some examples, the state-of-charge limitation requires a vehicle battery life to be less than 60% of a full charge. In other examples, the state-of-charge limitation requires the vehicle battery life to be between 10%-55% of a full charge. In still other examples, the state-of-charge limitation requires the vehicle battery life to be between 20%-50% of a full charge. In still other examples, the state-of-charge limitation requires the vehicle battery life to be between 20%-40% of a full charge. Additionally, the state-of-charge limitation may be based on the particular chemistry of the vehicle battery 12 such that the state-of-charge limitation may be variable from vehicle to vehicle. Moreover, the state-of-charge limitation may be gathered, stored, and/or determined by the vehicle processor 200 and/or the vehicle server 300.

The vehicle processor 200 is also configured to store vehicle battery life information. The vehicle battery life information generally pertains to the amount of vehicle battery life the vehicle battery 12 has remaining. Additionally, the vehicle battery life information may be affected by one or more of the vehicle event data 206, the vehicle mode 208, the vehicle location 204, and the transport length 210. Moreover, the vehicle battery life information may include whether the vehicle 10 is within the state-of-charge limitation that may be implemented by the transport vehicle along the route. For example, the vehicle battery life information may include whether the vehicle battery life is within the acceptable charge limit of a particular transport vehicle.

With further reference to FIGS. 1 and 2, the server 300 is configured as a network and/or a cloud-based system that communicates with the vehicle processor 200. It is also contemplated that the vehicle processor 200 may communicate any or all of the vehicle data 202 to the server 300 for further processing and/or evaluation. Further, the vehicle processor 200 and/or the server 300 may continuously and/or regularly update such that the vehicle data 202 is updated in real time.

The server 300 may also be configured to communicate with third-party processors 500 to collect third-party data. For example, the third-party processors 500 may include, but are not limited to, vehicle processors 200 along the route. Additionally or alternatively, the third-party processors 500 may include third-party user devices within vehicles along the route such as, for example, cellular phones and/or tablets. Further, the third-party processors 500 may include third-party databases such as databases including transport vehicle schedules, weather information, and/or traffic conditions. It is generally contemplated that the third-party data may include information related to one or more of the vehicle location 204, the vehicle event data 206, and/or the vehicle mode 208 from the third-party processors 500.

Moreover, the third-party data may include data from a dealership or a dealership portal. For example, the third-party data may include information related to sales, transport, or other related data. More specifically, the server may use the third-party data from the dealership portal to predict when the vehicle 10 may be transported. For example, if the third-party data includes data that the vehicle 10 has sold and needs to be transported from a storage location to a dealership for pickup, the server 300 may determine transport is imminent and take the appropriate steps to ensure safe transport.

Referring still to the example shown in FIGS. 1 and 2, the server 300 is configured to determine if a transport mode should be activated based on one or more of vehicle location 204 and vehicle mode 208. For example, a vehicle owner or other user may communicate to the server 300 the desire to move the vehicle 10 to the transport mode. Additionally, in other examples, the server 300 may be notified by a third-party application of the desire to move the vehicle 10 to the transport mode, such as through a dealer portal. Moreover, in still other examples, the server 300 may be configured to determine if the transport mode is desired based on current location, route information, or other information related to the vehicle location 204. More specifically, the server 300 may use the route information including data that the transport vehicle is indicated along the route to determine that the transport mode should be activated.

Additionally, the server 300 is also configured to determine if the current vehicle battery life is above the state-of-charge limitation based on the vehicle event data 206. For example, the server 300 may use the vehicle data 202 including the current vehicle battery life information along with information regarding the state-of-charge limitation to determine whether the vehicle battery 12 is within the state-of-charge limitation. The state-of-charge limitation may be predetermined, input by a user, obtained from a third-party application, or determined by the server 300 based on a chemistry of the vehicle battery 12. Further, the server 300 is also configured to notify the user that the transport mode cannot be activated if the server 300 determines that the current vehicle battery life is above the state-of-charge limitation.

Additionally, if the current vehicle battery life is above the state-of-charge limitation, the server 300 is configured to prompt the user to decide if they would like to discharge the excess energy of the vehicle battery 12. Discharging the excess energy of the vehicle battery 12 may include offloading excess energy back to an energy grid if the vehicle 10 is coupled to a vehicle charger and/or starting battery depleting operations if not coupled to a vehicle charger. The battery depleting operations may include one or more of enabling max accessory loads including one or more of a chiller operation increase, an increase in coolant flow rate, additional vehicle imaging, activating vehicle sensors to a high-load mode, activating discharge of cell groups by activating cell balancing resistors, and activating inefficient operation of vehicle components including one or more of a vehicle motor or vehicle inverter. Additionally, in some examples, the choice between offloading the excess energy from the vehicle battery 12 back to the energy grid and activating battery depleting operations may be made by the user. In other examples, the server 300 may be configured to determine whether the vehicle 10 is coupled to the vehicle charger such that offloading the excess energy from the vehicle battery 12 back to the energy grid is an available option. If not, then battery depleting operations may be activated. Additionally or alternatively, if the vehicle 10 is coupled to the vehicle charger, the server 300 may start offloading the excess energy from the vehicle battery 12 to the energy grid if desired by the user.

Additionally, the server 300 may be configured to determine the time it would take for the current vehicle battery life to be less than state-of-charge limitation. For example, the server 300 may determine the time it would take for the vehicle 10 to offload the excess energy from the vehicle battery 12 back to the energy grid, the time it would take to offload the excess energy by activating battery depleting operations, and the time it would take to offload the excess energy of the vehicle battery 12 by both sending the offloaded energy back to the energy grid and activating the battery depleting operations simultaneously.

Additionally, the server 300 may be configured to notify the user (i.e., issue a notification) of the time it would take for the vehicle battery life to be less than state-of-charge limitation. For example, the server 300 may notify the user of one or more of the times it would take for the vehicle 10 to offload the excess energy back to the energy grid, the time it would take to offload the excess energy by activating battery depleting operations, and the time it would take to offload the excess energy of the vehicle battery 12 by both sending the offloaded energy back to the energy grid and activating the battery depleting operations simultaneously. Further, the user may then decide which method of offloading the excess energy from the vehicle battery 12 they would like to use. Additionally, it is contemplated that the server 300 may automatically choose the offloading method that takes the shortest amount of time without input from the user.

Additionally, once the current vehicle battery life is below the state-of-charge limitation, the server 300 may be configured to activate the transport mode. For example, the user may desire to activate the transport mode through a user input. When that user input is detected by the server 300, the server 300 will check the current vehicle battery life and determine if the vehicle battery life is above the state-of-charge limitation. If not, the server 300 will prompt the user to select a way to offload the excess energy. Once the current vehicle battery life is below the state-of-charge limitation, the server 300 will activate the transport mode.

Additionally, the server 300 may determine if long-range connectivity is active based on the vehicle event data 206.

The long-range connectivity may be lost due to remote locations or storage in a building type that cannot access Wi-Fi, Bluetooth®, or other connectivity means. When long-range connectivity is lost, the vehicle 10 is unable to notify the user of potentially dangerous battery conditions such as exceeding state-of-charge limitations for transport mode and/or dangerously low vehicle battery life. As such, if the long-range connectivity becomes inactive, the server 300 may notify the user of the lost connectivity so the user can take manual action to prevent the potentially dangerous battery conditions. Additionally, the server 300 may notify the user that the transport mode cannot be activated if current long-range connectivity is inactive. Further, the server 300 may be configured to notify the user if long-range connectivity becomes active and/or if the transport mode can now be activated. Moreover, in some examples, the server 300 may be configured to automatically activate the transport mode once the long-range connectivity becomes active and the current vehicle battery life is within the state-of-charge limitation.

Additionally, if the server 300 determines that the long-range connectivity is active, the server 300 may be configured to discharge the vehicle battery 12 if the current vehicle battery life is above the state-of-charge limitation. However, if it is determined that the long-range connectivity is active and the current vehicle battery life is within the state-of-charge limitation, the server 300 may be configured to activate the transport mode without further input from the user.

Similarly, the server 300 may be configured to determine if the vehicle is in airplane mode, which may affect connectivity to the vehicle 10. When airplane mode is active, the vehicle 10 is unable to notify the user of potentially dangerous battery conditions such as exceeding state-of-charge limitations for transport mode and/or dangerously low vehicle battery life. As such, if airplane mode is activated, the server 300 may notify the user of the lost connectivity so the user can take manual action to prevent potentially dangerous battery conditions. Additionally, the server 300 may be configured to automatically discharge the vehicle battery 12 if airplane mode is activated and the vehicle battery life is above the state-of-charge limitations to prevent the potentially dangerous battery conditions.

Referring now to the example shown in FIG. 2, the vehicle system 100 starts at step 700. The server 300 then determines if the transport mode has been activated by the user at step 704. The activation may be through a third-party application such as a dealership portal at step 702. Next, the server 300 will attempt to enter transport mode or an alternative mode such as airplane mode at step 706. The server 300 determines whether transport mode has been selected at step 708. Then the server 300 determines whether the current vehicle battery life is above the state-of-charge limitation at step 710. If the current vehicle battery life is less than the state-of-charge limitation, the server 300 activates transport mode on the vehicle 10 in step 712 and ends at step 736. However, if the current vehicle battery life is greater than the state-of-charge limitation, the server 300 determines if the long-range connectivity is lost at step 714. If the long-range connectivity is lost, the server 300 is configured to notify the user that the long-range connectivity is lost and the vehicle 10 is unable to send notifications or to request help for issues with the vehicle battery 12 at step 716. Additionally, the server 300 is configured to notify the user that the vehicle battery 12 is not in a safe state to activate the desired mode in step 718.

Next, the server 300 determines if the vehicle 10 is plugged into a vehicle charger at step 720. If the vehicle 10 is not connected to a vehicle charger, the server 300 calculates the discharge time to get within the state-of-charge limitation by operating battery depleting operations at step 724. However, if the vehicle 10 is connected to a vehicle charger, the server 300 calculates the time it takes to get within the state-of-charge limitation by sending the excess energy from the vehicle battery 12 back to the power grid at step 722. Additionally, the server 300 may notify the user of the discharge times and ask if they want to proceed with the discharge at step 726. If the user does not want to proceed, the server 300 may notify the customer that transport mode was not activated due to the vehicle battery life at step 734 and the operation ends at step 736. If the user does want to proceed with the discharge of the vehicle battery 12, the server 300 is configured to discharge the vehicle battery 12 and notify the customer that the vehicle 10 is not in transport mode until the discharge is complete at step 728. At step 730, the server 300 continuously checks the vehicle battery life during discharge of the vehicle battery 12 to determine if the current vehicle battery life is below the state-of-charge limitation. When the current vehicle battery life is within the state-of-charge limitation, the server 300 may notify the user that the discharge is complete at step 732. The server 300 then puts the vehicle 10 in transport mode at step 712 before ending operation at step 736.

Electric vehicles in transit often have a charge that is less than the maximum charge to comply with state-of charge limitations. While some vehicles include a mode that limits charging to a certain percentage after leaving the manufacturing plant, once the vehicle arrives at its destination such as a dealership, the charging limitation is removed. The vehicle system 100 as described herein ensures battery state-of-charge limitation compliance prior to the vehicle 10 being placed in transport mode at any point in the vehicle life.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A vehicle system for a vehicle, the vehicle system comprising:
   a vehicle processor of the vehicle configured to store vehicle data including vehicle event data and a vehicle mode for the vehicle; and
   a server communicatively coupled to the vehicle processor and configured to:
      determine, based on the vehicle mode, that a transport mode has been selected for the vehicle indicating that the vehicle is or will be transported by another vehicle;
      determine that a current battery charge of a battery of the vehicle is above a state-of-charge limit based on the vehicle event data;
      based on determining that the transport mode has been selected and that the current battery charge is above the state-of-charge limit, present a notification at the vehicle that the transport mode cannot be activated; and
      activate the transport mode once the current battery charge is below the state-of-charge limit.

2. The vehicle system of claim 1, wherein the server is configured to, based on determining that the transport mode has been selected and that the current battery charge is above the state-of-charge limit, discharge the battery upon user activation.

3. The vehicle system of claim 2, wherein discharging the battery includes one or more of discharging energy from the battery back to an energy grid through a vehicle charger or activating one or more battery depleting operations.

4. The vehicle system of claim 3, wherein the battery depleting operations include one or more of enabling max accessory loads including one or more of a chiller operation increase, an increase in coolant flow rate, additional vehicle imaging, activating vehicle sensors to a high-load mode, activating discharge of cell groups by activating cell balancing resistors, and activating inefficient operation of vehicle components including one or more of a vehicle motor or vehicle inverter.

5. A vehicle incorporating the vehicle system of claim 1.

6. A vehicle system for a vehicle, the vehicle system comprising:
   a vehicle processor of the vehicle configured to store vehicle data including vehicle event data and a vehicle mode for the vehicle; and
   a server communicatively coupled to the vehicle processor and configured to:
      determine, based on the vehicle mode, that a transport mode has been selected for the vehicle indicating that the vehicle is or will be transported by another vehicle;
      determine that a current battery charge of a battery of the vehicle is above a state-of-charge limit based on the vehicle event data; and
      based on determining that the transport mode has been selected and that the current battery charge is above the state-of-charge limit:
         determine an amount of time it would take for the current battery charge to be less than the state-of-charge limit;
         present a notification at the vehicle of the amount of time it would take for the current battery charge to become less than the state-of-charge limit;
         discharge the battery upon user activation; and
         activate the transport mode once the current battery charge is below the state-of-charge limit.

7. The vehicle system of claim 6, wherein discharging the battery is done through returning energy from the battery to a power grid.

8. The vehicle system of claim 6, wherein discharging the battery is done through one or more battery depletion operations of the vehicle.

9. The vehicle system of claim 6, wherein the server is configured to prompt a user to choose a mode of discharge of the battery.

10. The vehicle system of claim 6, wherein the vehicle event data includes data related to the current battery charge.

11. A vehicle system for a vehicle, the vehicle system comprising:

a vehicle processor of the vehicle configured to store vehicle data including vehicle event data and a vehicle mode for the vehicle; and a server communicatively coupled to the vehicle processor and configured to:

determine, based on the vehicle mode, that a transport mode has been selected for the vehicle indicating that the vehicle is or will be transported by another vehicle;

determine whether a current battery charge of a battery of the vehicle is above a state-of-charge limit based on the vehicle event data;

based on determining that the current battery charge is below the state-of-charge limit, activate the transport mode; and based on determining that the current battery charge is above the state-of-charge limit, discharge the battery upon user activation.

12. The vehicle system of claim 11, wherein discharge of the battery includes one or more of returning energy from the battery back to an energy grid or activating one or more battery depleting operations.

13. The vehicle system of claim 12, wherein the battery depleting operations include one or more of enabling max accessory loads including one or more of a chiller operation increase, an increase in coolant flow rate, additional vehicle imaging, activating vehicle sensors to a high-load mode, activating discharge of cell groups by activating cell balancing resistors, and activating inefficient operation of vehicle components including one or more of a vehicle motor or vehicle inverter.

14. The vehicle system of claim 11, wherein the vehicle event data includes data related to the current battery charge.

* * * * *